United States Patent
Kwon

(10) Patent No.: US 11,784,851 B2
(45) Date of Patent: Oct. 10, 2023

(54) METHOD FOR CONTROLLING COMMUNICATION AND APPARATUS USING THE SAME

(71) Applicant: ARAD NETWORKS, Daejeon (KR)

(72) Inventor: Young Min Kwon, Gyeonggi-do (KR)

(73) Assignee: ARAD NETWORKS, Daejeon (KR)

( * ) Notice: Subject to any disclaimer, the term of this patent is extended or adjusted under 35 U.S.C. 154(b) by 224 days.

(21) Appl. No.: 17/350,703

(22) Filed: Jun. 17, 2021

(65) Prior Publication Data

US 2022/0407741 A1    Dec. 22, 2022

(51) Int. Cl.
*H04L 12/46* (2006.01)
*H04L 47/20* (2022.01)
*H04L 49/00* (2022.01)
*G06F 9/455* (2018.01)
*H04L 49/354* (2022.01)

(52) U.S. Cl.
CPC ...... *H04L 12/4633* (2013.01); *G06F 9/45558* (2013.01); *H04L 47/20* (2013.01); *H04L 49/354* (2013.01); *H04L 49/70* (2013.01); *G06F 2009/45595* (2013.01)

(58) Field of Classification Search
CPC ... H04L 12/4633; H04L 47/20; H04L 49/354; H04L 49/70; G06F 9/45558; G06F 2009/45595
See application file for complete search history.

(56) References Cited

U.S. PATENT DOCUMENTS

| | | | |
|---|---|---|---|
| 10,015,132 B1 * | 7/2018 | Qin | H04L 61/2567 |
| 11,533,197 B2 * | 12/2022 | Wondra | H04L 45/64 |
| 2017/0149583 A1 * | 5/2017 | Hira | H04L 12/1886 |
| 2018/0309718 A1 * | 10/2018 | Zuo | H04L 61/2521 |
| 2019/0222559 A1 * | 7/2019 | Wang | H04L 63/0272 |
| 2020/0288386 A1 * | 9/2020 | Glazemakers | H04L 63/0272 |
| 2022/0279421 A1 * | 9/2022 | Sivakumar | H04L 45/04 |

FOREIGN PATENT DOCUMENTS

| | | |
|---|---|---|
| JP | 2017-224895 A | 12/2017 |
| KR | 10-2017-0088722 A | 8/2017 |

* cited by examiner

Primary Examiner — Habte Mered
(74) Attorney, Agent, or Firm — Nicholas Park

(57) ABSTRACT

Disclosed is a communication control method of a container in a container environment provided from a computing apparatus, performed by a controller. The communication control method may include, when the container is newly generated, generating a flow rule for controlling a communication path of a data packet related to the container through a software switch supporting OpenFlow; generating tunnel information that includes a tunnel inner Internet protocol (IP) corresponding to the container; and transmitting the flow rule or the tunnel information to the computing apparatus.

13 Claims, 12 Drawing Sheets

[FIG. 1]
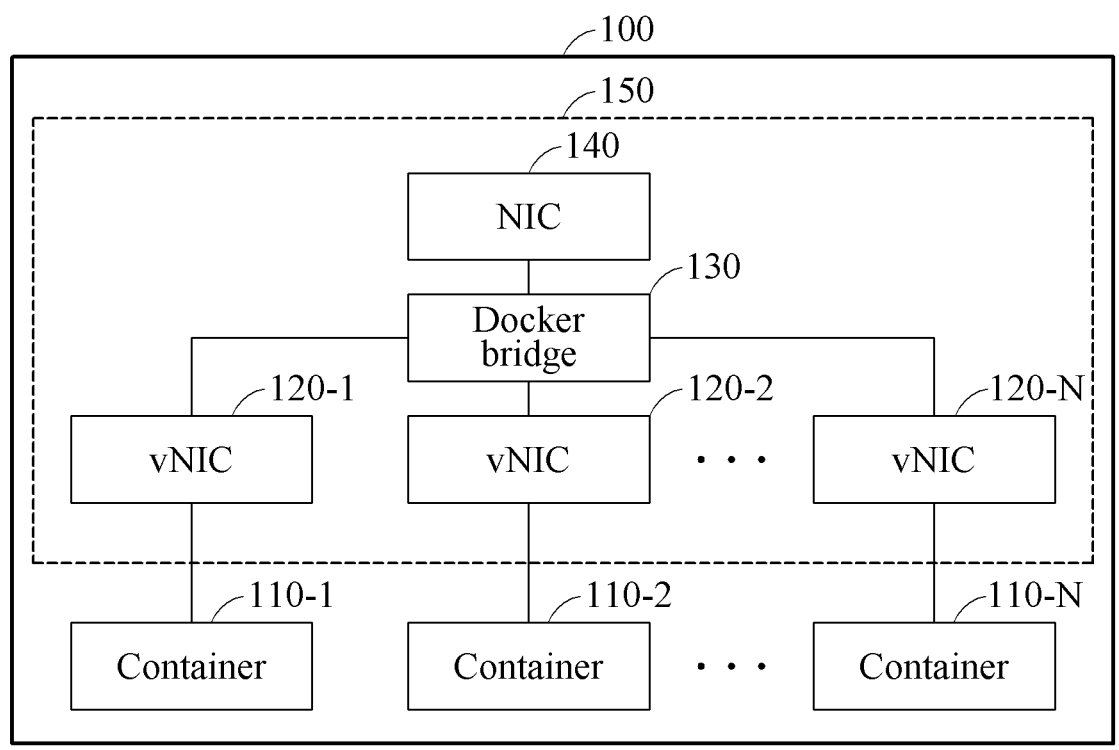

[FIG. 2]
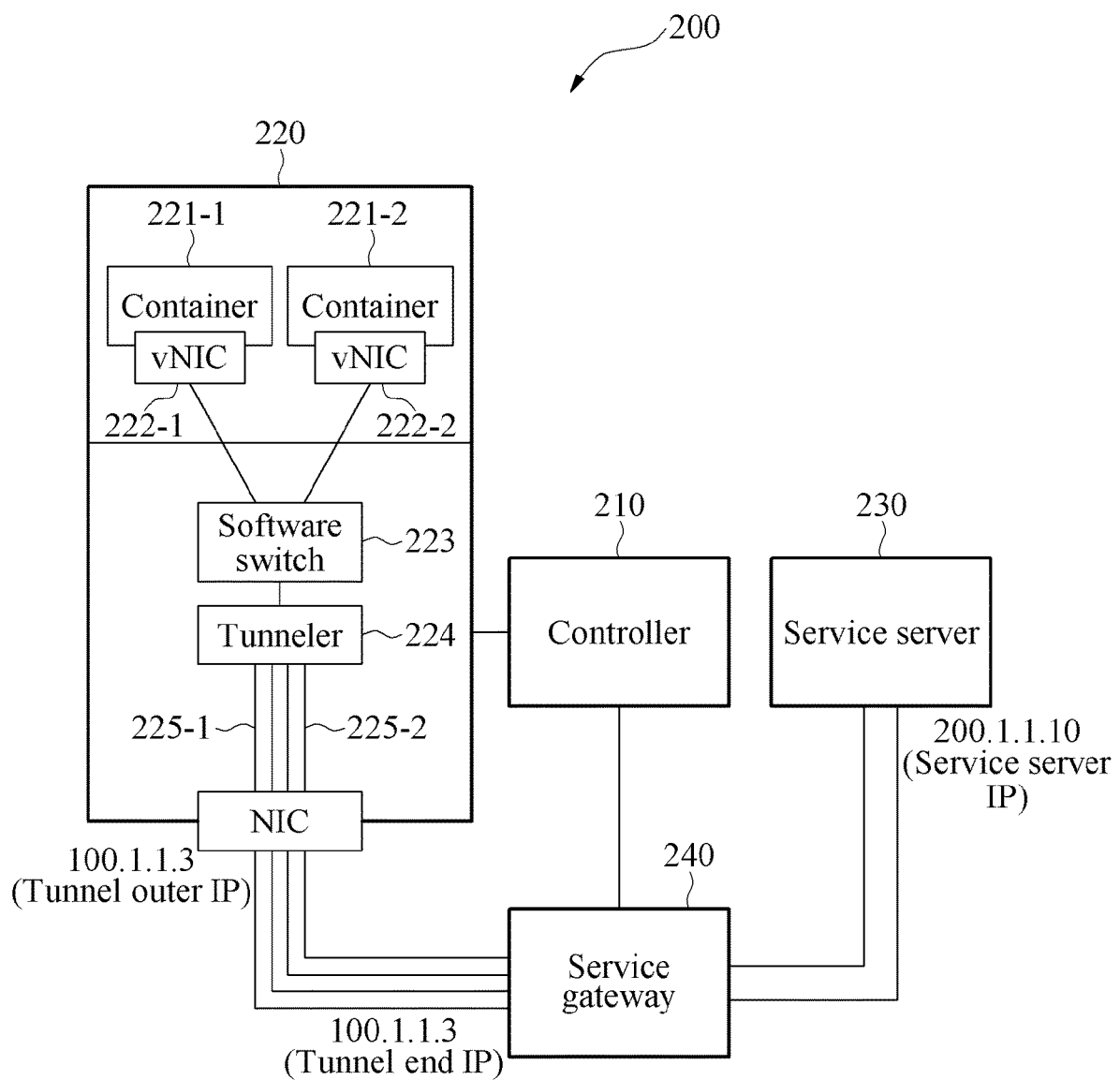

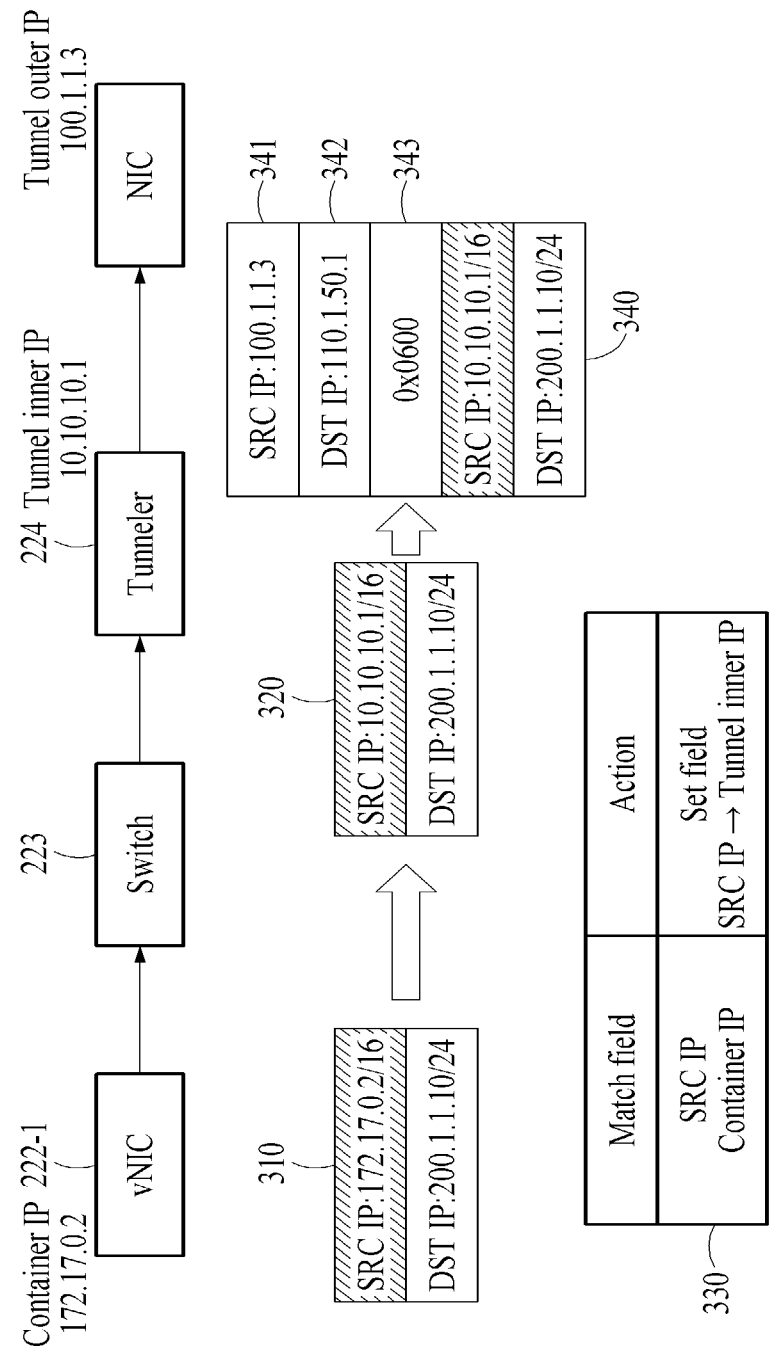
[FIG. 3A]

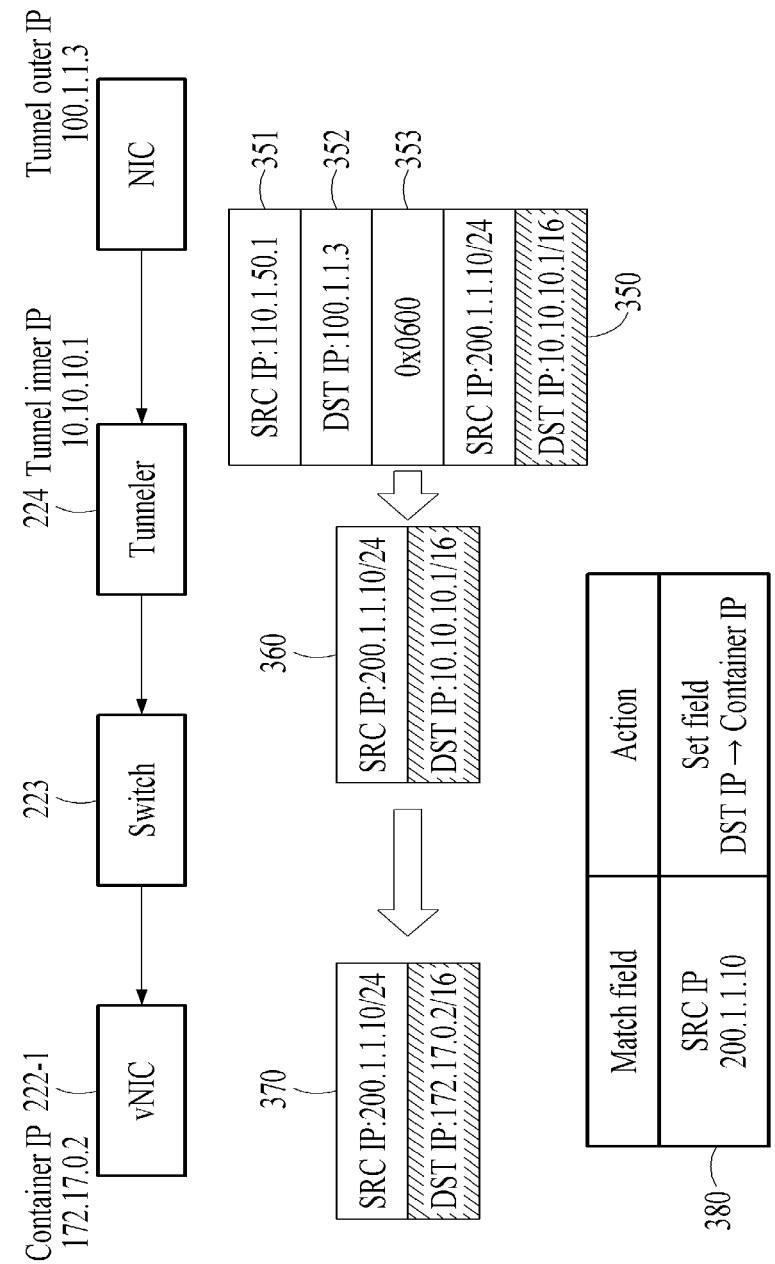
[FIG. 3B]

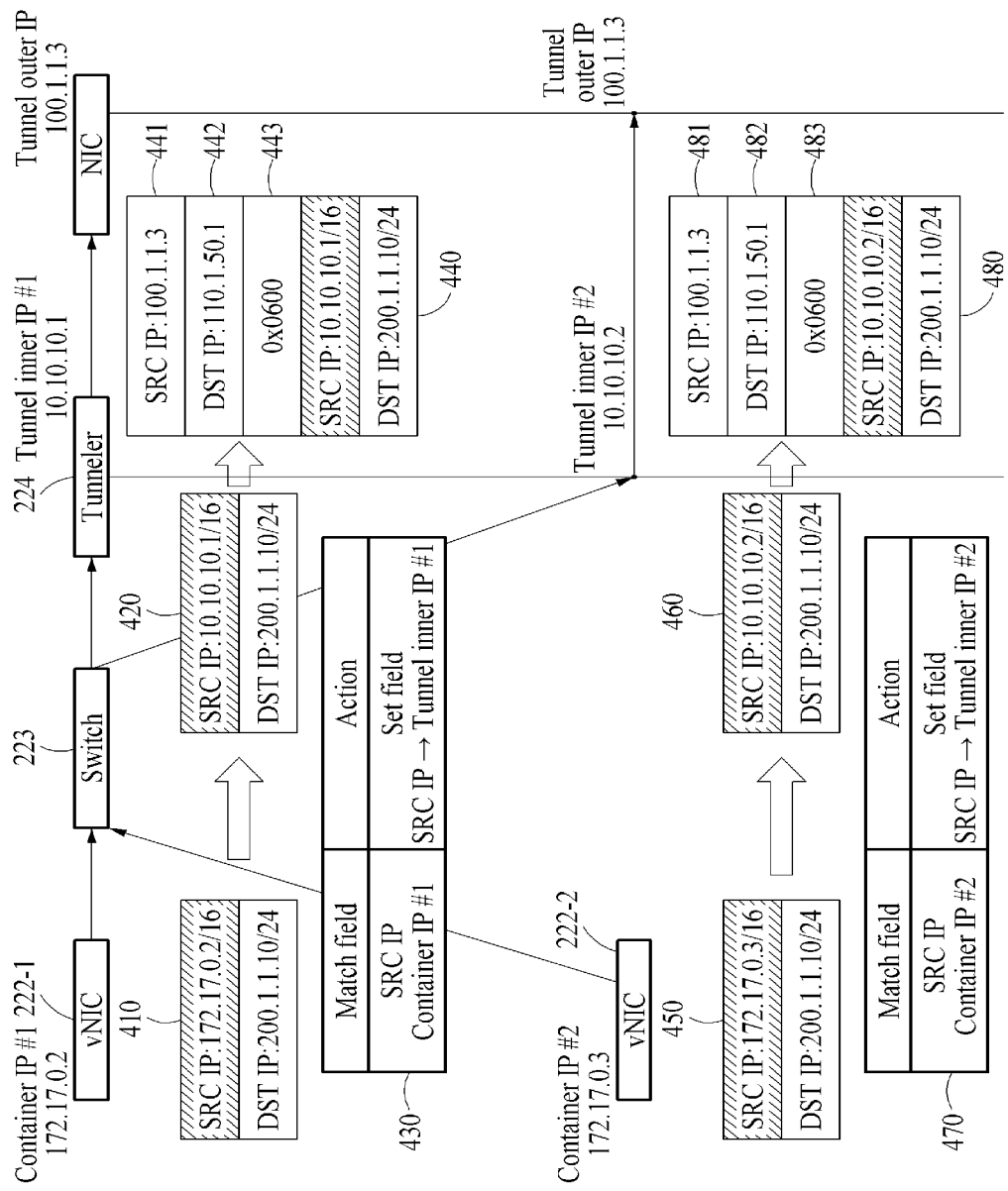
[FIG. 4]

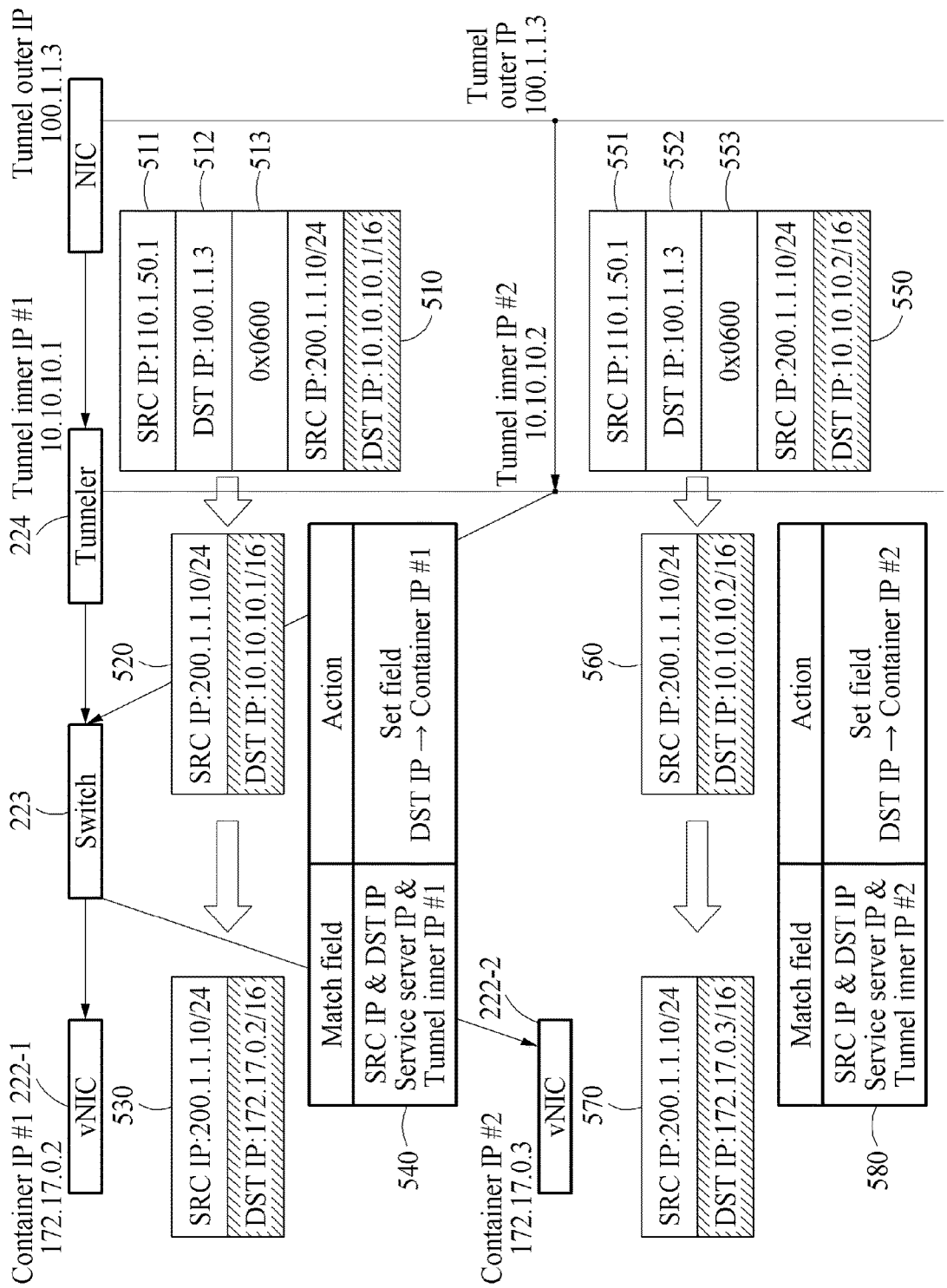

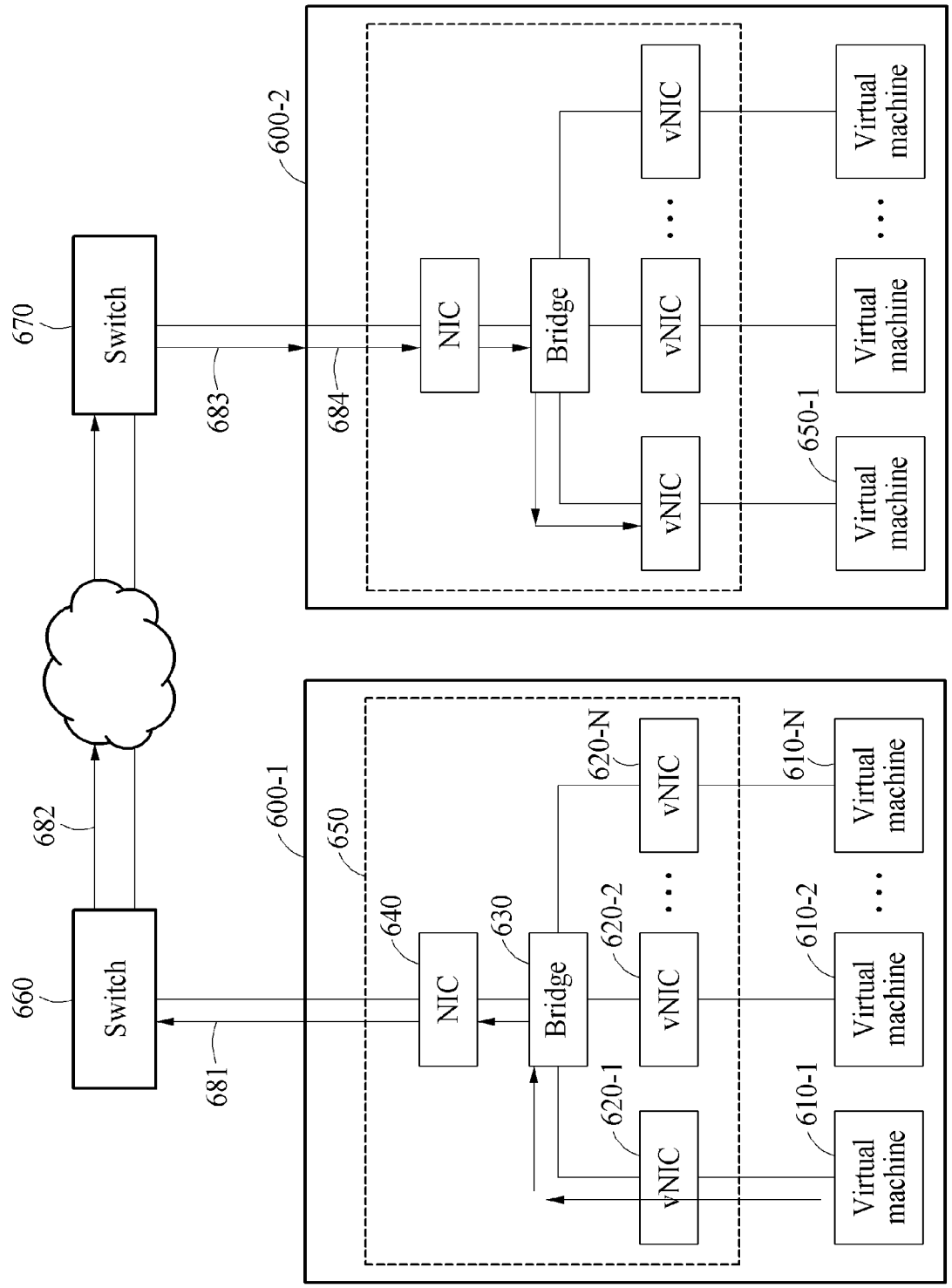

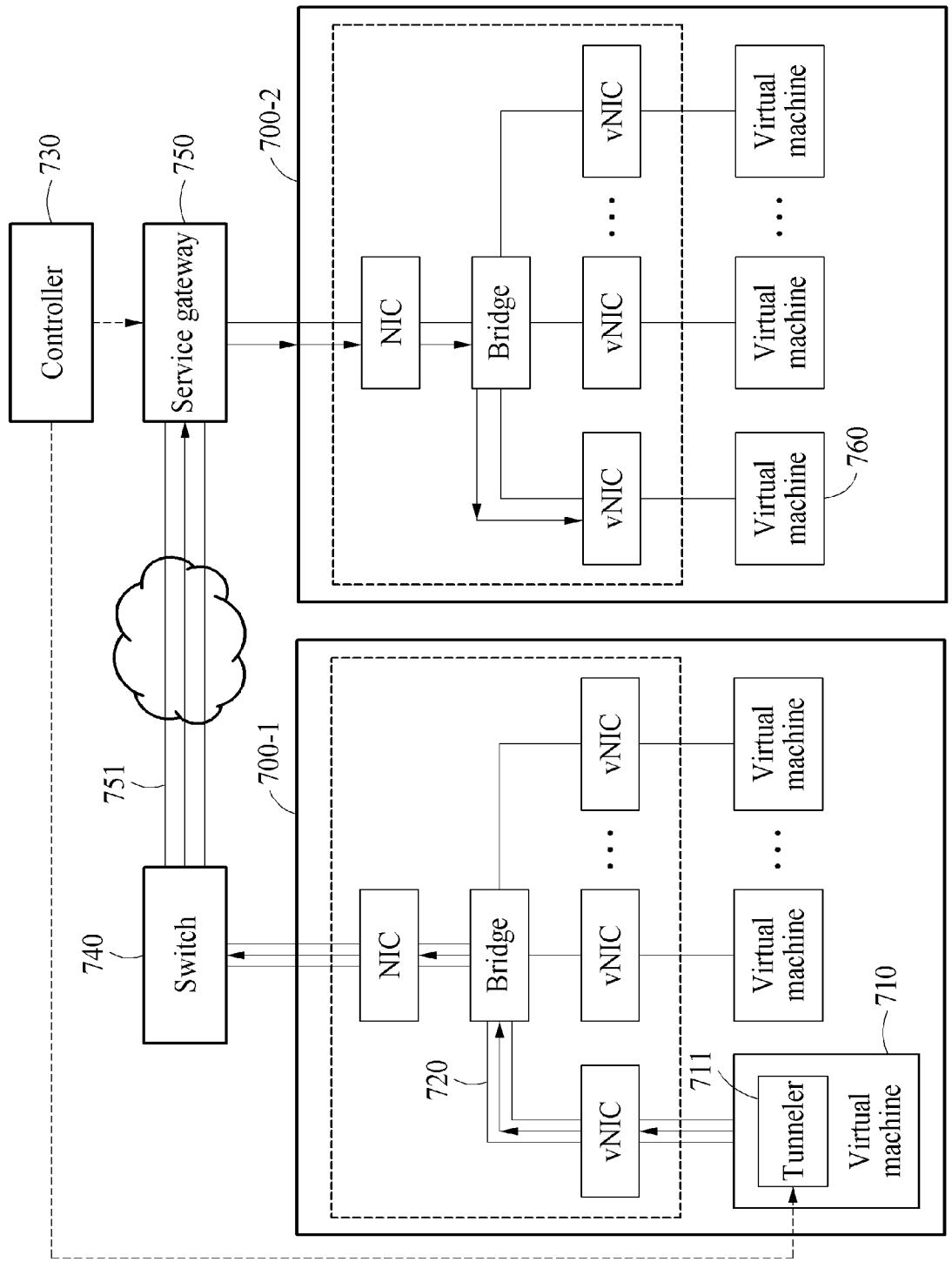
[FIG. 7]

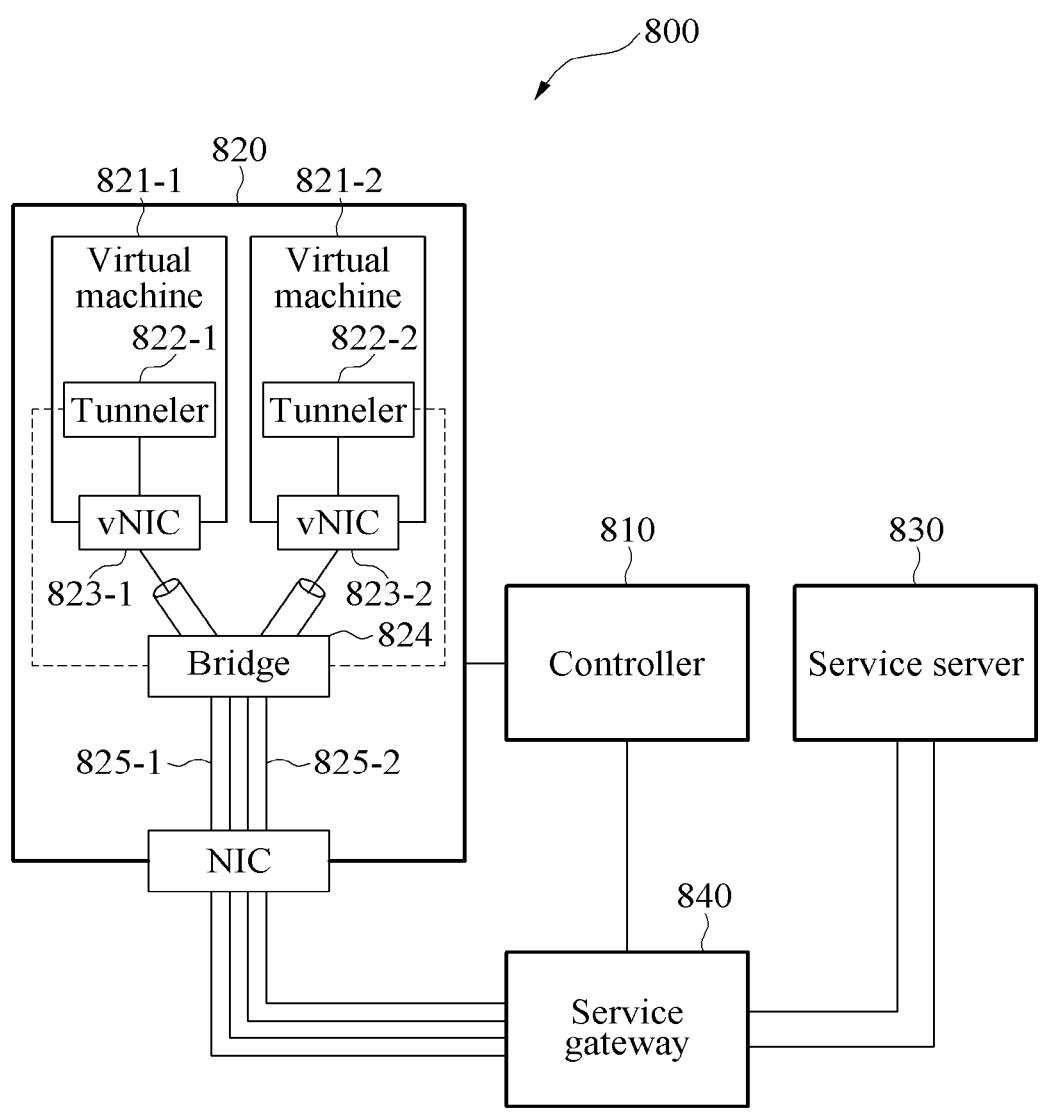
[FIG. 8]

[FIG. 9]
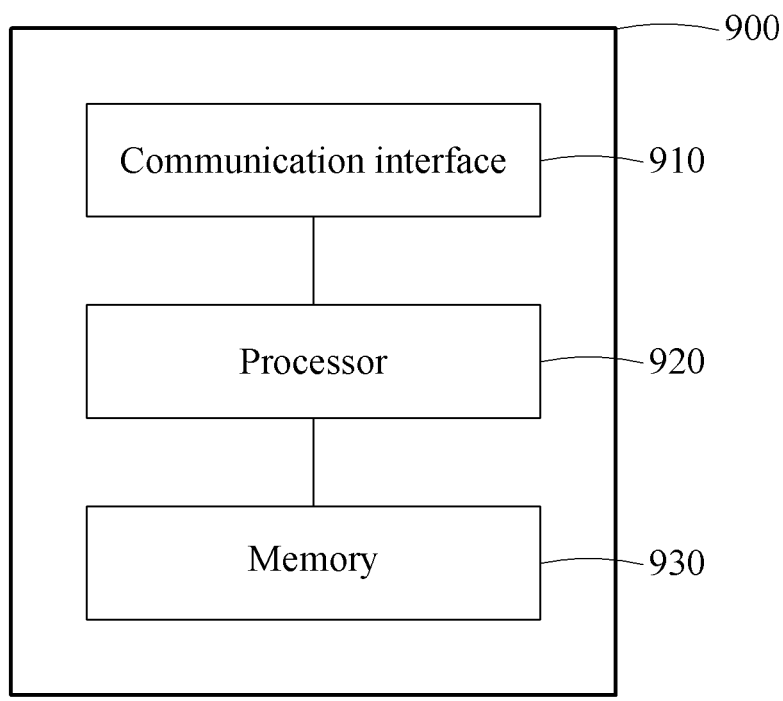

[FIG. 10]
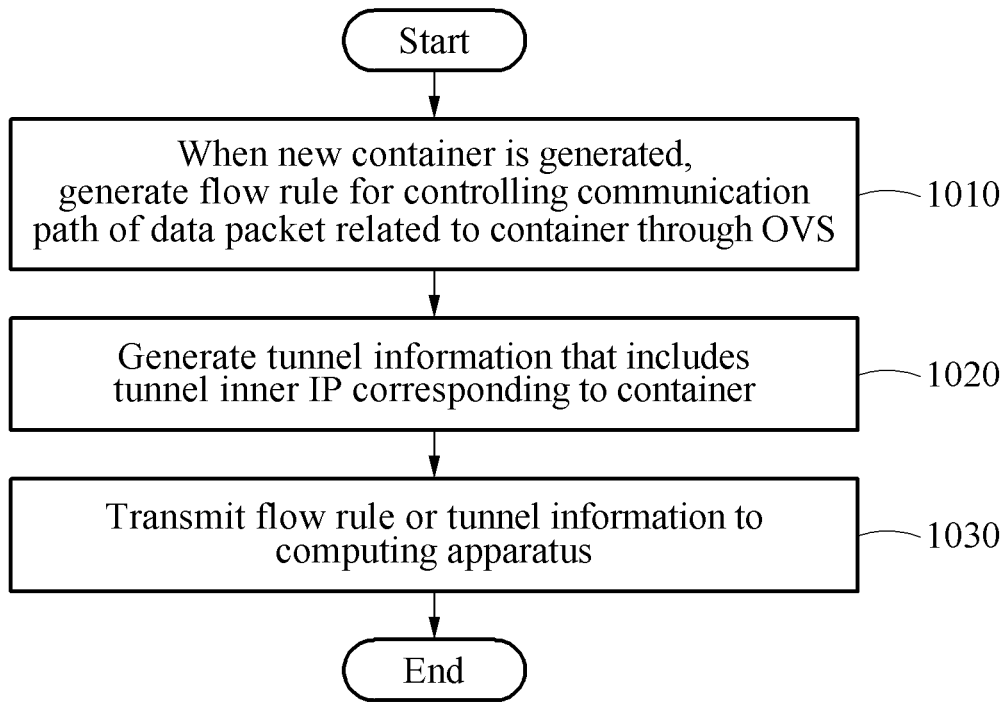

[FIG. 11]
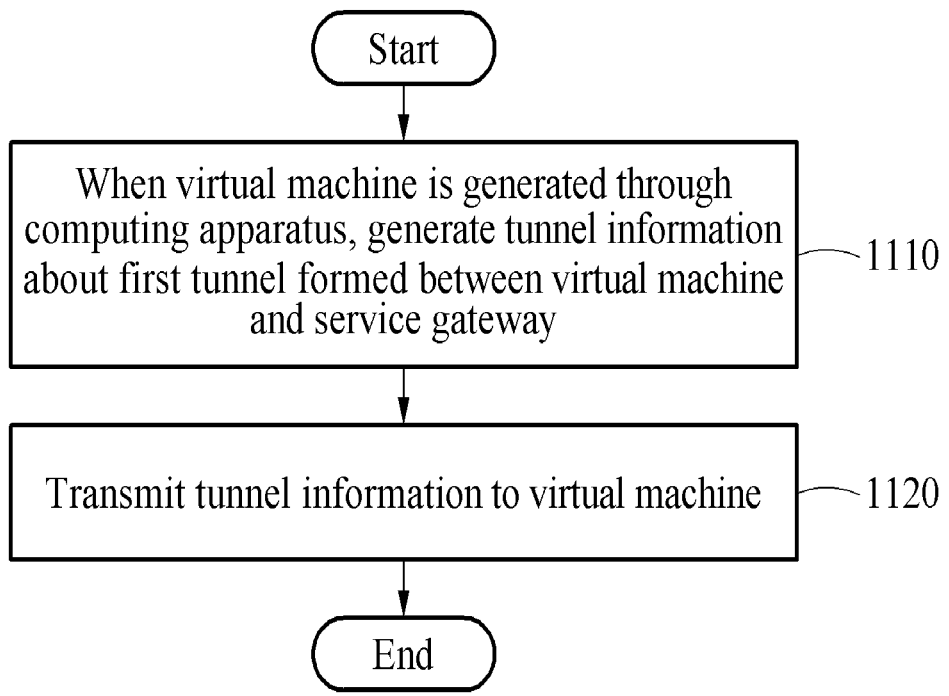

METHOD FOR CONTROLLING COMMUNICATION AND APPARATUS USING THE SAME

BACKGROUND

1. Field

Technical Field

The present disclosure relates to a communication control method and an apparatus using the same.

2. Related Art

A virtual machine refers to a computing environment implemented by software and may also refer to a machine that implements a logical virtual operating system (OS) on a physical system OS to enable an independent operation.

As a related art, a container refers to technology that allows different applications to operate in the isolated space.

The virtual machine virtualizes the entire guest OS on a host OS and controls the same through a hypervisor, and the container isolates each process to operate like a virtual machine without using the hypervisor.

SUMMARY

Characteristic constitutions of the disclosure to accomplish the aforementioned objectives and to achieve characteristic effects of the disclosure are as follows:

According to an aspect of example embodiments, there is provided a communication control method for a container in a container environment provided from a computing apparatus, performed by a controller, the communication control method including, when the container is newly generated, generating a flow rule for controlling a communication path of a data packet related to the container through a software switch supporting OpenFlow; generating tunnel information that includes a tunnel inner Internet protocol (IP) corresponding to the container; and transmitting the flow rule or the tunnel information to the computing apparatus.

The flow rule may include a first flow rule for transmitting a (1-1)-th data packet generated by the container to the tunnel inner IP.

The first flow rule, when a source IP of the (1-1)-th data packet corresponds to a IP of the container, may include information for generating a (1-2)-th data packet by changing the source IP of the (1-1)-th data packet with the tunnel inner IP through the software switch supporting OpenFlow.

The flow rule may include a second flow rule for transmitting a (2-1)-th data packet received from an external entity to the container.

The second flow rule, when a destination IP of a (2-2)-th data packet corresponding to a decapsulated (2-1)-th data packet is the same as the tunnel inner IP, may include information for generating a (2-3)-th data packet by changing the destination IP with an IP of the container.

Also, the second flow rule, when a destination IP of a (2-2)-th data packet corresponding to a decapsulated (2-1)-th data packet is the same as an IP of a predetermined computing apparatus, may include information for generating a (2-3)-th data packet by changing the destination IP with an IP of the container.

According to another example embodiment, there is provided a communication control method for controlling communication between virtual machines in a virtual machine environment provided from a computing apparatus, performed by a controller, the communication control method including, when a first virtual machine is generated through the computing apparatus, generating tunnel information about a first tunnel formed between the first virtual machine and a service gateway; and transmitting the tunnel information to the first virtual machine.

According to an example embodiment, there is provided a controller including a communication interface configured to communicate with a computing apparatus that provides a container environment; and a processor configured to generate a flow rule for controlling container communication. The processor is configured to, when a container is newly generated, generate a flow rule for controlling a communication path of a data packet related to the container through a software switch supporting OpenFlow, generate tunnel information that includes a tunnel inner IP corresponding to the container, and transmit at least one of the flow rule and the tunnel information to the computing apparatus.

According to another example embodiment, there is provided a controller including a communication interface configured to communicate with a computing apparatus that provides a virtual machine environment; and a processor configured to generate tunnel information for transmitting a data packet generated by a virtual machine. The processor is configured to, when the virtual machine is generated through the computing apparatus, generate tunnel information about a tunnel formed between the virtual machine and a service gateway, transmit the tunnel information to the virtual machine, and transmit the tunnel information to the service gateway.

BRIEF DESCRIPTION OF THE FIGURES

The accompanying following figures to explain example embodiments of the disclosure are only a portion of the example embodiments of the disclosure and those skilled in the art to which this disclosure pertains may readily acquire other figures based on the figures without an inventive work being made:

FIG. 1 illustrates an example of a computing apparatus that provides a container environment;

FIG. 2 illustrates an example of a system in which a communication control method is applied according to an example embodiment;

FIGS. 3A and 3B illustrate an example of describing an operation of a server according to an example embodiment;

FIG. 4 illustrates another example of describing an operation of a server according to an example embodiment;

FIG. 5 illustrates still another example of describing an operation of a server according to an example embodiment;

FIG. 6 illustrates an example of describing a communication scheme between virtual machines present in different host servers in a virtual machine environment;

FIG. 7 illustrates an example of describing a scheme of controlling communication between virtual machines present in different host servers in a virtual machine environment through a communication control method according to an example embodiment;

FIG. 8 illustrates an example of a system in which a communication control method is applied to a virtual machine environment according to an example embodiment;

FIG. 9 illustrates an example of a configuration of a controller according to an example embodiment;

FIG. 10 is a flowchart illustrating an example of a communication control method performed by a controller in a container environment; and FIG. 11 is a flowchart illustrating an example of a communication control method performed by a controller in a virtual machine environment.

DETAILED DESCRIPTION

The following detailed description of this disclosure is described with reference to the accompanying drawings in which specific example embodiments of the disclosure are illustrated as examples, to fully describe purposes, technical solutions, and advantages of the disclosure. The example embodiments are described in detail enough for those skilled in the art to carry out the disclosure.

Also, the terms "comprises/includes" used throughout the detailed description and the claims and modifications thereof are not intended to exclude other technical features, additions, components, or operations. Also, "single" or "one" is used to indicate at least one and "another" is limited to at least second or more.

Those skilled in the art may clearly understand a portion of other purposes, advantages, and features of the disclosure from this specification and another portion thereof from implementations of the disclosure. The following examples and drawings are provided as examples only and not to limit the disclosure. Therefore, the detailed description disclosed herein should not be interpreted as a limiting meaning with respect to a specific structure or function and should be interpreted as representative basic data that provides guidelines such that those skilled in the art may variously implement the disclosure as substantially suitable detailed structures.

Further, the disclosure may include any possible combinations of example embodiments described herein. It should be understood that, although various example embodiments of the disclosure differ from each other, they do not need to be exclusive. For example, a specific shape, structure, and feature described herein may be implemented as another example embodiment without departing from the spirit and scope of the disclosure. Also, it should be understood that a position or an arrangement of an individual component of each disclosed example embodiment may be modified without departing from the spirit and scope of the disclosure. Accordingly, the following detailed description is not to be construed as being limiting and the scope of the disclosure, if properly described, is limited by the claims, their equivalents, and all variations within the scope of the claims. In the drawings, like reference numerals refer to like elements throughout.

Unless the context clearly indicates otherwise, the singular forms "a," "an," and "the," are intended to include the plural forms as well. Also, when description related to a known configuration or function is deemed to render the present disclosure ambiguous, the corresponding description is omitted.

Hereinafter, example embodiments of the disclosure are described in detail with reference to the accompanying drawings such that those skilled in the art may easily perform the disclosure.

FIG. 1 illustrates an example of a computing apparatus that provides a container environment.

A computing apparatus 100 that provides a container environment through a plurality of containers 110-1, 110-2, . . . , 110-N may include the plurality of containers 110-1, 110-2, . . . , 110-N, virtual network interface cards (vNICs) 120-1, 120-2, . . . , 120-N for network connection of the respective containers 110-1, 110-2, . . . , 110-N, a network interface card (NIC) 140 corresponding to a physical network interface for communication of the computing apparatus 100, and a docker bridge 130 that functions as a bridge between the NIC 140 and the vNICs 120-1, 120-2, . . . , 120-N.

When the containers 110-1, 110-2, . . . , 110-N are generated, a namespace corresponding to each of the containers 110-1, 110-2, . . . , 110-N may be generated and the containers 110-1, 110-2, . . . , 110-N may be connected to the docker bridge 130 through the respective corresponding vNICs 120-1, 120-2, . . . , 120-N.

An area 150 of the computing apparatus 100 may correspond to LAYER 2 corresponding to a broadcast area. Therefore, an IP network performed in LAYER 3 may not be performed in the area 150. Communication may be performed in such a manner that all the data packets present in the docker bridge 130 may be exposed to the respective corresponding vNICs 120-1, 120-2, . . . , 120-N, each of the containers 110-1, 110-2, . . . , 110-N receives a corresponding data packet and discards other packets.

In the aforementioned container environment, a data packet generated by each of the containers 110-1, 110-2, . . . , 110-N may not be targeted and thereby transmitted to an IP of each corresponding tunnel. Therefore, since a data packet may not be transmitted to an IP of each corresponding isolated tunnel, a network separation for each container through an isolated tunnel may not be performed, which may lead to vulnerability in terms of a network security of the system.

FIG. 2 illustrates an example of a system to which a communication control method is applied according to an example embodiment.

According to an example embodiment, a system 200 may include a host server 220 configured to provide a container environment, a service gateway 240 configured to relay communication between the host server 220 and an external service server 230, and a controller 210 configured to control communication between the host server 220 and the service gateway 240.

The host server 220 may include a software switch 223 and a tunneler 224. The tunneler 224 may generate a plurality of tunnels each to which a different tunnel inner IP is assigned based on a single module. Through this, the host server 220 may provide a method capable of sending a data packet to an outside through a separate tunnel for each container and receiving a data packet received from the outside through a separate tunnel for each container.

The service server 230 may include an entity configured to communicate with containers 221-1 and 221-2 that are implemented through the host server 220. For example, the service server 230 may include an Internet of things (IoT) terminal sensing information collection server according to a service that is provided. However, it is provided as an example only. It is apparent to those skilled in the art that the service server 230 may correspond to any computing apparatus.

The host server 220 configured to provide the container environment capable of implementing the plurality of containers 221-1 and 221-2 may generate separate tunnels 225-1 and 225-2 respectively corresponding to the containers 221-1 and 221-2 through the tunneler 224. A data packet generated by each of the containers 221-1 and 221-2 may be forwarded to the service gateway 240 through each corresponding tunnel 225-1, 225-2 and may be finally transmitted to the service server 230. On the reverse, a data packet generated through the service server 230 may be transmitted to each of the containers 221-1 and 221-2 through each corresponding separate tunnel 225-1, 225-2. By communicating through the tunnels 225-1 and 225-2 distinguished for the respective containers 221-1 and 221-2, each network of the containers 221-1 and 221-2 may be isolated, and communication security may be further improved. In detail, although a communication path corresponding to the tunnel 225-1 is hacked, stability of data communication through a communication path corresponding to the tunnel 225-2 may be maintained. Accordingly, security of the system 200 may be improved.

As described above with reference to FIG. 1, a process of implementing the system 200 may simply perform LAYER 2-based communication in the container environment and may not perform LAYER 3-based IP communication. Therefore, an issue may arise in the aforementioned process of realizing communication path isolation for each of the containers 221-1 and 221-2. In detail, although the plurality of tunnels corresponding to different tunnel inner IPs is generated through the tunneler 224, a data packet generated by each of the containers 221-1 and 221-2 could not be targeted and transmitted to each corresponding tunnel inner IP.

To outperform the above issue, herein, there may be provided a method capable of transmitting a data packet generated by each of the containers 221-1 and 221-2 to a tunnel inner IP corresponding to each of the containers 221-1 and 221-2 by arranging the software switch 223 before the tunneler 224. In detail, the host server 220 may transmit a data packet to a corresponding tunnel inner IP by setting a target path of the data packet through the software switch 223. Herein, there may be provided an isolated communication network for each container through a plurality of tunnels even in a container environment in which conventional LAYER 2-based communication is performed.

According to an example embodiment, the software switch 223 may be a software switch supporting OpenFlow. For example, the software switch 223 may be Open vswitch (OVS). The OVS refers to an open source software switch capable of performing a multi-layered network function and may be a switch available even in LAYER 2. Many open source cloud or container systems, such as Docker, OpenStack, and Kubernetes that provide a container environment may support the OVS. Through introduction of OVS, a data packet generated by each of the containers 221-1 and 221-2 may be transmitted to a target IP, for example, a tunnel inner IP, or a data packet transmitted from an outside may be transmitted to each of the containers 221-1 and 221-2 each that is targeted based on a corresponding IP of containers. Although the following software switch is described based on the OVS, it is provided as an example only. It will be understood by those skilled in the art that the example embodiments may be implemented by any software switch that supports the open flow.

Although FIG. 2 illustrates two containers 221-1 and 221-2, it is provided as an example only and it will be apparent to those skilled in the art that a number of containers may increase or decrease depending on example embodiments.

Hereinafter, an operation of the system 200 is described in detail. To control an operation of the host server 220, the controller 210 may include a switch control module and a tunneler control module. For example, the controller 210 may generate a flow rule for controlling an OVS through the switch control module and may generate tunnel information, for example, each tunnel inner IP, tunnel end IP, tunnel outer IP, mapping information between a tunnel inner IP and a container, and routing information, through the tunneler control module. When a new container is generated through the host server 220, the controller 210 may generate a flow rule and tunnel information corresponding to the new container and may transmit the generated flow rule and tunnel information to the host server 220 and the service gateway 240.

When a data packet to be transmitted to the service server 230 is generated through the container 221-1, the host server 220 may forward the data packet to the tunnel 225-1 by modifying a source IP (SRC IP) of the data packet through the software switch 223. The data packet generated through the container 221-1 may be transmitted to the service gateway 240 through the tunnel 225-1. In a similar manner, when a data packet to be transmitted to the service server 230 is generated through the container 221-2, the host server 220 may transmit the data packet to the service gateway 240 through the tunnel 225-2 that is generated in correspondence to the container 221-2.

When a data packet is received from the host server 220, the service gateway 240 may perform decapsulation for the received data packet and may transmit a data packet acquired through a decapsulation result to the service server 230.

On the contrary, when a data packet for the container 221-1 is received through the service server 230, the service gateway 240 may transmit the data packet through the tunnel 225-1 based on encapsulation. The host server 220 may transmit the corresponding data packet to the container 221-1 by modifying a destination IP (DST IP) of the received data packet through the software switch 223.

A communication control method based on the software switch 223 according to an example embodiment is further described with reference to the accompanying drawings.

FIGS. 3A and 3B illustrate an example of describing an operation of a server according to an example embodiment.

FIG. 3A illustrates an example of an operation performed by the host server 220 in a case in which a single container 221-1 is generated in the host server 220 and communication between the container 221-1 and a destination, for example, the service server 230 is ongoing.

FIG. 3A illustrates an operation of the host server 220 in a process of transmitting a (1-1)-th data packet generated by the container 221-1 to the service server 230. According to an example embodiment, when the (1-1)-th data packet is generated by the container 221-1, the vNIC 222-1 may forward the generated (1-1)-th data packet to the software switch 223. A (1-1)-th data packet 310 may include information about a source IP (SRC IP), for example, an IP of the container (172.17.0.2/16), and information about a destination IP (DST IP), for example, a service server IP (200.1.1.10/24).

The software switch 223 may generate a (1-2)-th data packet 320 by changing the source IP of the (1-1)-th data packet 310 with a tunnel inner IP based on a first flow rule 330.

For example, the software switch 223 may be the aforementioned OVS and the OVS may operate based on the first flow rule 330. In detail, the first flow rule 330 may include a match field area including condition information and an action field area defined for an operation performed when the condition information is met. For example, the first flow rule 330 may include, in the match field area, condition information corresponding to that the source IP of the (1-1)-th data packet 310 corresponds to an IP of the container and, if the corresponding condition is met, may include the action field area that includes operation information of changing the source IP of the (1-1)-th data packet with a tunnel inner IP through a predefined 'set-field' function.

The aforementioned operation of the software switch 223 is provided as an example only. It will be apparent to those skilled in the art that the software switch 223 may be implemented based on any software switch applicable in the container environment without being limited to the OVS.

The tunneler 224 that receives the (1-2)-th data packet 320 may generate a (1-3)-th data packet 340 through encapsulation based on tunnel outer IP information 341, tunnel end IP information 342, and other information 343, and may transmit the (1-3)-th data packet 340 to the service gateway 240 through an NIC. The service gateway 240 may perform decapsulation on the (1-3)-th data packet 340 and may transmit a data packet acquired through the decapsulation to the service server 230.

FIG. 3B illustrates an operation of the host server 220 in a process of forwarding a data packet generated by the service server 230 to the container 221-1.

According to an example embodiment, a data packet generated by the service server 230 may be transmitted to the tunneler 224 in a form of a (2-1)-th data packet 350 that is generated through encapsulation based on tunnel end IP information 351, tunnel outer IP information 352, and other information 353. The tunneler 224 may generate a (2-2)-th data packet 360 through decapsulation on the (2-1)-th data packet 350 and may transmit the (2-2)-th data packet 360 to the software switch 223. The software switch 223 may generate a (2-3)-th data packet 370 by changing a destination IP of the (2-2)-th data packet 360 through a second flow rule 380 and may transmit the (2-3)-th data packet 370 to the container 221-1 through the vNIC 222-1.

In detail, the second flow rule 380 may include a match field area including condition information that a source IP is a service server IP and an action field area including operation information of changing the destination ID of the (2-2)-th data packet 360 with the IP of the container 221-1 through a 'set-field' function FIG. 4 illustrates another example of describing an operation of a server according to an example embodiment.

FIG. 4 illustrates an example of an operation of the host server 220 in a case in which the plurality of containers 221-1 and 221-2 is implemented through the host server 220 and a data packet generated through each of the containers 221-1 and 221-2 is transmitted to a corresponding destination, for example, the service server 230. It will be apparent to those skilled in that the example embodiment is not limited to a number of containers illustrated herein and may apply to any number of containers.

Referring to FIG. 4, (1-1)-th data packets 410 and 450 generated through the containers 221-1 and 221-2, respectively, may be forwarded to the software switch 223 through the vNICs 222-1 and 222-2, respectively. The (1-1)-th data packet 410 may include source IP information (172.17.0.2/16) corresponding to the container 221-1 and destination IP information (200.1.1.10/24) corresponding to the service server 230, and the (1-1)-th data packet 450 may include source IP information (172.17.0.3/16) corresponding to the container 221-2 and destination IP information (200.1.1.10/24) corresponding to the service server 230.

The software switch 223 may generate a (1-2)-th data packet 420 by changing the source IP of the (1-1)-th data packet 410 with tunnel inner IP #1 (10.10.10.1/16) that is predetermined in correspondence to the container 221-1, based on a first flow rule 430. In the same manner, the software switch 223 may generate the second data packet 460 by changing the source IP of the first data packet 450 with tunnel inner IP #2 (10.10.10.2/16) that is predetermined in correspondence to the container 221-2, based on a first flow rule 470.

The tunneler 224 may generate a (1-3)-th data packet 440, 480 through encapsulation of the (1-2)-th data packet 420, 460 based on tunnel outer IP information 441, 481, tunnel end IP information 442, 482, and other information 443, 483, and may transmit the (1-3)-th data packet 440, 480 to the service gateway 240 through NIC. The service gateway 240 may perform decapsulation on the (1-3)-th data packet 440, 480 and may transmit, to the service server 230, a data packet acquired through the decapsulation.

FIG. 5 illustrates still another example of describing an operation of a server according to an example embodiment.

FIG. 5 illustrates an example of an operation of the host server 220 in a case in which the plurality of containers 221-1 and 221-2 is implemented through the host server 220 and a data packet generated through the service server 230 is received by the containers 221-1 and 221-2. It will be apparent to those skilled in the art that the example embodiment is not limited to a number of containers illustrated herein and may apply to any number of containers.

According to still another example, a data packet generated through the service server 230 is transmitted to the tunneler 224 in a form of a (2-1)-th data packet 510, 550 that is generated through encapsulation based on tunnel end IP information 511, 551, tunnel outer IP information 512, 552, and other information 513, 553. The tunneler 224 may generate a (2-2)-th data packet 520, 560 through decapsulation on the (2-1)-th data packet 510, 550 and may transmit the (2-1)-th data packet 520, 560 to the software switch 223. The software switch 223 may generate a (2-3)-th data packet 530, 570 by changing a destination IP of the (2-2)-th data packet 520, 560 through a second flow rule 540, 580 and may transmit a (2-3)-th data packet 530, 570 generated through the vNIC 222-1, 222-2 to the container 221-1, 222-2.

In detail, the second flow rule 540 may include a match field area including condition information that a source IP of the (2-2)-th data packet 520 is a service server IP and a destination IP of the (2-2)-th data packet 520 is tunnel inner IP #1 and an action field area including operation information of changing the destination IP of the (2-2)-th data packet 520 with an IP (172.17.0.2/16) of the container 221-1 through a 'set-field' function.

Likewise, the second flow rule 580 may include a match field area including condition information that a source IP of the (2-2)-th data packet 560 is a service server IP and a destination IP of the (2-2)-th data packet 560 is tunnel inner IP #2 and an action field area including operation information of changing the destination IP of the (2-2)-th data packet 560 with an IP (172.17.0.3/16) of the container 221-2.

A difference between the method of FIG. 3 and the method of FIG. 5 is to additionally include, in the match field areas of the second flow rules 540 and 580, information about whether the destination IPs correspond to the respective tunnel inner IPs. In a case in which the plurality of containers 221-1 and 221-2 is present, the example embodiment may transmit data received from the outside to each of the containers 221-1 and 221-2 through a corresponding separated terminal through the second flow rules 540 and 580.

Although only information about a source IP and a destination IP is illustrated for clarity of description, it will be apparent to those skilled in the art that the data packet described above with reference to FIGS. 3 to 5 may further include additional data.

FIG. 6 illustrates an example of describing a communication scheme between virtual machines present in different host servers in a virtual machine environment.

Referring to FIG. 6, a computing apparatus 600-1 that provides a virtual machine environment through a plurality of virtual machines 610-1, 610-2, . . . , 610-N may include the plurality of virtual machines 610-1, 610-2, . . . , 610-N, virtual network interface cards (vNICs) 620-1, 620-2, . . . , 620-N for network connection of the respective virtual machines 610-1, 610-2, . . . , 610-N, and an NIC 640 corresponding to a physical network interface for communication of the computing apparatus 600-1 and a bridge 630 present between the NIC 640 and the vNICs 620-1, 620-2, . . . , 620-N. Each of computing apparatuses 600-1 and 600-2 may correspond to a host server.

The virtual machines 610-1, 610-2, . . . , 610-N may be connected to the bridge 630 through the respective corresponding vNICs 620-1, 620-2, . . . , 620-N.

An area 650 of the computing apparatus 600-1 that provides the virtual machine environment may correspond to LAYER 2 corresponding to a broadcast area. Therefore, an IP network performed in LAYER 3 may not be performed in the area 650. Communication may be performed in such a manner that all the data packets present in the bridge 630 may be exposed to the respective corresponding vNICs 620-1, 620-2, . . . , 620-N, and each of the virtual machines 610-1, 610-2, . . . , 610-N receives a corresponding data packet and discards other packets.

In the aforementioned virtual machine environment, since a data packet generated by each of the virtual machines 610-1, 610-2, . . . , 610-N may not be targeted and thereby transmitted to an IP of each corresponding tunnel, a network separation through an isolated tunnel may not be performed, which may lead to vulnerability in security.

Also, transmission of a data packet from the virtual machine 610-1 implemented in the computing apparatus 600-1 to a virtual machine 650-1 implemented in the computing apparatus 600-2 may be performed through a path of an indicator with an arrowhead in FIG. 6. In this process, a routing setup in the computing apparatus 600-1 for operation 681, a routing setup in a switch 660 for operation 682, a routing setup in a switch 670 for operation 683, and a routing setup in the computing apparatus 600-2 for an operation followed by operation 684 are required. The routing setups may be manually performed, which may cause difficulty in controlling communication in an environment in which a plurality of virtual machines is present.

FIG. 7 illustrates an example of describing a scheme of controlling communication between virtual machines present in different host servers in a virtual machine environment through a communication control method according to an example embodiment.

Referring to FIG. 7, a controller 730 may generate tunnel information (e.g., a tunnel inner IP, a tunnel outer IP, a tunnel end IP, and mapping information between a virtual machine and a tunnel inner IP) about tunnels 720 and 751 and may transmit the tunnel information to a service gateway 750 and a virtual machine 710. The virtual machine 710 may transmit a data packet to a switch 740 through the tunnel 720 based on a tunneler 711 corresponding to a tunneling module for tunneling and the tunnel information received from the controller 730. That is, the virtual machine 710 may capsulate a data packet and may transmit capsulated data to the switch 740. The switch 740 may transmit the received data packet to a service gateway 750 through a tunnel 751 and the service gateway 750 may transmit the received data packet and may transmit the decapsulated same to virtual machines 760.

In the method of FIG. 7, a data packet may be transmitted from the virtual machines 710 to the virtual machines 760 through a one-time routing setup in the switch 740. Compared to the example embodiment of FIG. 6 in which the method of FIG. 6 requires four times of routing setups, the method of FIG. 7 according to the example embodiment may provide a method capable of performing more efficient data packet communication in the virtual machine environment.

FIG. 8 illustrates an example of a system to which communication control method is applied according to an example embodiment.

According to an example embodiment, a system 800 may include a server 820 configured to provide a virtual machine environment, a service gateway 840 configured to relay communication between the server 820 and an external service server 830, and a controller 810 configured to control communication between the server 820 and the service gateway 840.

The service server 830 may include any entity configured to communicate with virtual machines 821-1 and 821-2 implemented through the server 820.

The plurality of virtual machines 821-1 and 821-2 may respectively generate tunnels 825-1 and 825-2 corresponding to the respective virtual machines 821-1 and 821-2 through the respective corresponding tunnelers 822-1 and 822-2. The tunnelers 822-1 and 822-2 may be tunneling modules that are installed in the virtual machines 821-1 and 821-2, respectively, and may generate the tunnels 825-1 and 825-2, respectively, based on tunnel information (e.g., a tunnel end IP, a tunnel inner IP, a tunnel outer IP, and mapping information between a corresponding virtual machine and the tunnel inner IP) forwarded through the controller 810.

A data packet generated by each of the virtual machines 821-1 and 821-2 may be forwarded to the service gateway 840 through each corresponding tunnel 825-1, 825-1 and then finally transmitted to the service server 830. On the reverse, a data packet generated through the service server 830 may be transmitted to each the virtual machines 821-1 and 821-2 through each corresponding separate tunnel 825-1, 825-2. By transmitting a data packet through each of the tunnels 825-1 and 825-2 distinguished for the respective corresponding virtual machines 821-1 and 821-2, a network may be distinguished for each of the virtual machines 821-1 and 821-2 and communication security may be further improved. In detail, although a communication path corresponding to the tunnel 825-1 is hacked, stability of data communication through a communication network corresponding to the tunnel 825-2 may be maintained and security of the system 800 may be improved.

Also, according to the system 800 disclosed herein, since a data packet is transmitted through each of the tunnels 825-1 and 825-2 generated to correspond to the virtual machines 821-1 and 821-2, respectively, data communication may be performed based on a small number of routing setups compared to the related art in which a routing setup needs to be performed for each of a transmission host server, a transmission switch, a reception switch, and a reception host server in a process of performing communication between virtual machines provided to different host servers.

Although FIG. 8 illustrates two virtual machines 821-1 and 821-2, a number of virtual machines is not limited thereto. It will be apparent to those skilled in the art that the number of virtual machines may increase or decrease depending on example embodiments.

Hereinafter, an operation of the system 800 is described in detail. The controller 810 may include a tunneler control module to control an operation of the server 820. For example, the controller 810 may generate tunnel information that includes each tunnel inner IP, tunnel end IP, and mapping information between a tunnel inner IP and a container, and routing information, through the tunneler control module and may forward the generated tunnel information to the server 820 or the service gateway 840. When a new virtual machine is generated through the server 820, the controller 810 may generate tunnel information corresponding to the new virtual machine and may transmit the generated tunnel information to the server 820 and the service gateway 840.

When a data packet to be transmitted to the service server 830 is generated through the virtual machine 821-1, the server 820 may transmit the data packet to the service gateway 840 through the tunnel 825-1. In a similar manner, when a data packet to be transmitted to the service server 830 is generated through the virtual machine 821-2, the server 820 may transmit the data packet to the service gateway 840 through the tunnel 825-2 generated in correspondence to the virtual machine 821-2.

When a data packet is received from the server 820, the service gateway 840 may perform decapsulation on the received data packet and may transmit a data packet acquired through the decapsulation result to the service server 830.

On the contrary, when a data packet for the virtual machines 821-1 is received through the service server 830, the service gateway 840 may transmit the data packet to the server 820 through the tunnel 825-1 based on encapsulation. The virtual machines 821-1 may receive the data packet through the tunnel 825-1, a vNIC 823-1, and the tunneler 822-1.

FIG. 9 illustrates an example of a configuration of a controller according to an example embodiment.

Referring to FIG. 9, a controller 900 according to an example embodiment may include a communication interface 910 configured to communicate with an external entity, a processor 920 configured to generate tunnel information or a flow rule, and a memory 930 configured to store the generated tunnel information or flow rule.

The communication interface 910 may operate under control of the processor 920. The communication interface 910 may transmit a single in a wired communication manner or a wireless communication manner in response to an instruction from the processor 920. The communication interface 910 may communicate with an external apparatus, for example, a server and a service gateway in the wireless communication manner or the wired communication manner. The communication interface 910 may transmit and receive a request and a response to and from another interacting computing apparatus. As an example, the request and the response may be implemented using the same transmission control protocol (TCP) session. However, it is provided as an example only. For example, the request and the response may be transmitted and received as a user datagram protocol (UDP) datagram.

The processor 920 may execute a program command stored in the memory 930. The processor 920 may refer to a dedicated processor configured to perform the methods according to the disclosure, such as, for example, a central processing unit (CPU). The memory 930 may include a volatile storage medium and/or a non-volatile storage medium. For example, the memory 930 may include read only memory (ROM) and/or random access memory (RAM). Also, the processor 920 may include a hardware component, for example, a micro processing unit (MPU), a central processing unit (CPU) or a tensor processing unit (TPU), a cache memory, and a data bus. Also, the processor 920 may further include an operating system (OS) and a software component of an application that performs a specific purpose.

In the case of controlling a server configured to provide a container environment as in FIG. 2, the processor 920 may operate based on a switch control module and a tunneler control module as described above.

In the case of controlling a server configured to provide a virtual machine environment as in FIG. 8, the processor 920 may operate based on the tunneler control module as described above.

The configuration of the controller 900 described with reference to FIG. 9 is provided as an example only. For example, the controller 900 may further include others component in addition to the components of FIG. 9. For example, the controller 900 may further include an input interface and an output interface.

FIG. 10 is a flowchart illustrating an example of a communication control method performed by a controller in a container environment.

In a container environment provided from a computing apparatus, a controller may control communication of a container. For example, the computing apparatus may correspond to the host server 220 of FIG. 2 configured to provide the container environment.

Referring to FIG. 10, in operation 1010, when the container is newly generated, the controller may generate a flow rule for controlling a communication path of a data packet related to the container through an OVS.

According to an example embodiment, the flow rule may include a first flow rule for transmitting a (1-1)-th data packet generated by the container to a tunnel inner IP and a second flow rule for transmitting a (2-1)-th data packet received from an external entity to the container.

When a source IP of the (1-1)-th data packet corresponds to an IP of the container, the first flow rule may include information for generating a (1-2)-th data packet by changing the source IP of the (1-1)-th data packet with the tunnel inner IP through the OVS. Examples of the first flow rule may include the flow rules 330, 430, and 480.

When a destination IP of a (2-2)-th data packet corresponding to a decapsulated (2-1)-th data packet corresponds to the tunnel inner IP, the second flow rule may include information for generating a (2-3)-th data packet by changing the destination IP with an IP of the container. When the destination IP of the (2-2)-th data packet corresponding to the decapsulated (2-1)-th data packet corresponds to an IP of a predetermined computing apparatus, the second flow rule may include information for generating the (2-3)-th data packet by changing the destination IP of the (2-2)-th data packet with the IP of the container. Examples of the second flow rule may include the second flow rules 380, 540, and 580. Each of the second flow rules 540 and 580 corresponding to a case in which a plurality of containers is present may further include, in the match field area, a condition that a destination IP corresponds to a tunnel inner IP corresponding to the container, which differs from the second flow rule 380.

In operation 1020, the controller may generate tunnel information that includes a tunnel inner IP corresponding to the container. A different tunnel inner IP may be assigned to each container and thus, containers may correspond to different tunnel information, respectively. That is, data packet communication may be performed through a different tunnel for each container based on different tunnel information.

In operation 1030, the controller may transmit the generated flow rule or tunnel information to the computing apparatus or a service gateway.

FIG. 11 is a flowchart illustrating an example of a communication control method performed by a controller in a virtual machine environment.

The controller may control communication between virtual machines in a virtual machine environment provided from a computing apparatus. For example, the computing apparatus may correspond to the server 820 of FIG. 8.

In operation 1110, when a virtual machine is newly generated, the controller may generate tunnel information about a tunnel formed between the virtual machine and a service gateway. For example, the tunnel information may include a tunnel inner IP, a tunnel outer IP, a tunnel end IP, and mapping information between the virtual machine and the tunnel inner IP.

In operation 1120, the controller may transmit the generated tunnel information to the virtual machine. According to an example embodiment, a first tunnel inner IP corresponding to the newly generated first virtual machine may differ from a second tunnel inner IP corresponding to a second virtual machine that is generated in advance. Accordingly, each virtual machine may transmit a data packet to an outside through a separate tunnel or may receive a data packet from the outside through the separate tunnel.

To provide a separate tunnel for each virtual machine, each virtual machine may separately include a tunneler, for example, a tunneling module for tunneling. A plurality of tunnelers may not be provided to share a single kernel area. Therefore, dissimilar to a container environment in which a plurality of containers shares a single tunneler, each virtual machine may include each corresponding separate kernel area. Therefore, each virtual machine may include a separate tunneler. Accordingly, a separate OVS may not be required in the virtual machine environment, which differs from the container environment in which a separate OVS needs to be provided to generate a separate tunnel for each container.

One of ordinary skill in the art may easily understand that the methods and/or processes and operations described herein may be implemented using hardware components, software components, or a combination thereof based on the example embodiments. For example, the hardware components may include a general-purpose computer and/or exclusive computing apparatus or a specific computing apparatus or a special feature or component of the specific computing apparatus. The processes may be implemented using at least one microprocessor having an internal and/or external memory, a microcontroller, an embedded microcontroller, a programmable digital signal processor or other programmable devices. In addition, or, as an alternative, the processes may be implemented using an application specific integrated circuit (ASIC), a programmable gate array, a programmable array logic (PAL), or other devices configured to process electronic signals, or combinations thereof. Targets of technical solutions of the disclosure or portions contributing to the arts may be configured in a form of program instructions performed by various computer components and stored in non-transitory computer-readable recording media. The media may include, alone or in combination with the program instructions, data files, data structures, and the like. The program instructions recorded in the media may be specially designed and configured for the disclosure, or may be known to those skilled in the art of computer software. Examples of the media may include magnetic media such as hard disks, floppy disks, and magnetic tapes; optical media such as CD-ROM discs, DVDs, and Blu-ray; magneto-optical media such as floptical disks; and hardware devices that are specially configured to store and perform program instructions, such as ROM, RAM, flash memory, and the like. Examples of program instructions may include a machine code, such as produced by a compiler and higher language code that may be executed by a computer using an interpreter. Examples of program instructions include both machine code, such as produced by a compiler and files containing structural programming languages such as C++ object-oriented programming language and high or low programming languages (assembly languages, hardware technical languages, database programming languages and techniques) to run not only on one of the aforementioned devices but also a processor, a processor architecture, or a heterogeneous combination of combinations of different hardware and software components, or a machine capable of executing program instructions. Accordingly, they may include a machine language code, a byte code, and a high language code executable using an interpreter and the like.

Therefore, according to an aspect of the disclosure, the aforementioned methods and combinations thereof may be implemented by one or more computing apparatuses as an executable code that performs the respective operations. According to another aspect, the methods may be implemented by systems that perform the operations and may be distributed over a plurality of devices in various manners or all of the functions may be integrated into a single exclusive, stand-alone device, or different hardware. According to another aspect, devices that perform operations associated with the aforementioned processes may include the aforementioned hardware and/or software. Such all of the sequences and combinations associated with the processes are to be included in the scope of the disclosure.

For example, the described hardware devices may be to act as one or more software modules in order to perform the operations of the disclosure, or vice versa. The hardware devices may include a processor, such as, for example, an MPU, a CPU, a GPU, and a TPU, configured to be combined with a memory such as ROM/RAM configured to store program instructions and to execute the instructions stored in the memory, and may include a communicator capable of transmitting and receiving a signal with an external device. In addition, the hardware devices may include a keyboard, a mouse, and an external input device for receiving instructions created by developers.

While this disclosure is described with reference to specific matters such as components, some example embodiments, and drawings, they are merely provided to help general understanding of the disclosure and this disclosure is not limited to the example embodiments. It will be apparent to those skilled in the art that various alternations and modifications in forms and details may be made from the example embodiments.

Therefore, the scope of this disclosure is not defined by the example embodiments, but by the claims and their equivalents, and all variations within the scope of the claims and their equivalents are to be construed as being included in the disclosure.

Such equally or equivalently modified example embodiments may include, for example, logically equivalent methods capable of achieving the same results as those acquired by implementing the method according to the example embodiments. Accordingly, the present disclosure and the scope thereof are not limited to the aforementioned example embodiments and should be understood as a widest meaning allowable by law.

What is claimed is:

1. A communication control method for a container in a container environment provided from a computing apparatus, performed by a controller, the communication control method comprising:
when the container is newly generated, generating a flow rule for controlling a communication path of a data packet related to the container through a software switch supporting OpenFlow;
generating tunnel information related to a tunnel used for transmission of data generated from the container that comprises a tunnel inner Internet protocol (IP) and a tunnel outer IP corresponding to the container; and
transmitting the flow rule or the tunnel information to the computing apparatus,
wherein the tunnel inner IP is assigned a different IP according to each of the plurality of containers,
wherein the tunnel outer IP is assigned the same IP to each of the plurality of containers,
wherein a source IP address of data packet generated by the container is changed to the tunnel inner IP corresponding to the container through the software switch based on the flow rule.

2. The communication control method of claim 1, wherein the flow rule comprises a first flow rule for transmitting a (1-1)-th data packet,
wherein the (1-1)-th data packet is generated by the container to the tunnel inner IP.

3. The communication control method of claim 2, wherein the first flow rule, when a source IP of the (1-1)-th data packet corresponds to an IP of the container, comprises information for generating a (1-2)-th data packet,
wherein the (1-2)-th data packet is generated by changing the source IP of the (1-1)-th data packet with the tunnel inner IP through the software switch supporting OpenFlow.

4. The communication control method of claim 1, wherein the flow rule comprises a second flow rule for transmitting a (2-1)-th data packet,
wherein the (2-1)-th data packet is received from an external entity to the container.

5. The communication control method of claim 4, wherein the second flow rule comprises information for generating a (2-3)-th data packet from a (2-2)-th data packet,
wherein the (2-2)-th data packet is generated by decapsulating the (2-1)-th data packet,
wherein the (2-3)-th data packet is generated by changing a destination IP of the (2-2)-th data packet with an IP of the container when the destination IP of the (2-2)-th data packet corresponds to the predetermined tunnel inner IP.

6. The communication control method of claim 4, wherein the second flow rule comprises information for generating the (2-3)-th data packet from the (2-2)-th data packet,
wherein the (2-2)-th data packet is generated by decapsulating the (2-1)-th data packet,
wherein the (2-3)-th data packet is generated by changing the destination IP of the (2-2)-th data packet with an IP of the container when the destination IP of the (2-2)-th data packet corresponds to a predetermined computing apparatus IP.

7. A communication control method for controlling communication between virtual machines in a virtual machine environment provided from a computing apparatus, performed by a controller, the communication control method comprising:
when a first virtual machine is generated through the computing apparatus, generating tunnel information about a first tunnel formed between the first virtual machine and a service gateway; and
transmitting the tunnel information to the first virtual machine,
wherein the first tunnel is assigned a different tunnel inner Internet protocol (IP) with a second tunnel corresponding to predetermined second virtual machine,
wherein the first tunnel and the second tunnel are generated based on tunnel respectively included the first virtual machine and the second virtual machine,
the first tunnel and the second tunnel are assigned a same tunnel outer IP.

8. A non-transitory computer-readable record medium storing program instructions that, when executed by a processor, cause the processor to perform the method of claim 1.

9. A controller comprising:
a communication interface configured to communicate with a computing apparatus that provides a container environment; and
a processor configured to generate a flow rule for controlling container communication,
wherein the processor is configured to
when a container is newly generated, generate a flow rule for controlling a communication path of a data packet related to the container through a software switch supporting OpenFlow,
generate tunnel information related to a tunnel used for transmission of data generated from the container that comprises a tunnel inner Internet protocol (IP) and a tunnel outer IP corresponding to the container, and
transmit at least one of the flow rule and the tunnel information to the computing apparatus,
wherein the tunnel inner IP is assigned a different IP according to each of the plurality of containers,
wherein the tunnel outer IP is assigned the same IP to each of the plurality of containers,
wherein a source IP address of data packet generated by the container is changed to the tunnel inner IP corresponding to the container through the software switch based on the flow rule.

10. The controller of claim 9, wherein the flow rule comprises a first flow rule for transmitting a (1-1)-th data packet,
wherein the (1-1)-th data packet is generated by the container to the tunnel inner IP.

11. The controller of claim 10, wherein the first flow rule, when a source IP of the (1-1)-th data packet corresponds to an IP of the container, comprises information for generating a (1-2)-th data packet,
wherein the (1-2)-th data packet is generated by changing the source IP of the (1-1)-th data packet with the tunnel inner IP through the software switch supporting OpenFlow.

12. The controller of claim 9, wherein the flow rule comprises a second flow rule for transmitting a (2-1)-th data packet,
wherein the (2-1)-th data packet is received from an external entity to the container.

13. The controller of claim 12, wherein the second flow rule comprises information for generating a (2-3)-th data packet from a (2-2)-th data packet,
- wherein the (2-2)-th data packet is generated by decapsulating the (2-1)-th data packet,
- wherein the (2-3)-th data packet is generated by changing a destination IP of the (2-2)-th data packet with an IP of the container when the destination IP of the (2-2)-th data packet corresponds to the predetermined tunnel inner IP.

* * * * *